United States Patent
Cowap

(10) Patent No.: US 8,410,627 B2
(45) Date of Patent: Apr. 2, 2013

(54) SELF ORIENTING VERTICAL AXIS WIND TURBINE

(76) Inventor: Stephen F. Cowap, St. Charles, MO (US)

( * ) Notice: Subject to any disclaimer, the term of this patent is extended or adjusted under 35 U.S.C. 154(b) by 743 days.

(21) Appl. No.: 12/610,002

(22) Filed: Oct. 30, 2009

(65) Prior Publication Data

US 2011/0101694 A1    May 5, 2011

(51) Int. Cl.
 *F03D 9/00* (2006.01)
(52) U.S. Cl. .......................................... 290/55
(58) Field of Classification Search .................. 290/44, 290/55

See application file for complete search history.

(56) References Cited

U.S. PATENT DOCUMENTS

| | | | |
|---|---|---|---|
| 3,918,839 B1 | 11/1975 | Blackwell et al. | |
| 4,050,246 B1 | 9/1977 | Bourquardez | |
| 4,087,202 B1 | 5/1978 | Musgrove | |
| 4,105,363 A * | 8/1978 | Loth | 416/41 |
| 4,105,363 B1 | 8/1978 | Loth | |
| 4,161,370 A * | 7/1979 | Oppolzer | 416/17 |
| 4,274,809 A * | 6/1981 | Delgado et al. | 416/117 |
| 4,274,809 B1 | 6/1981 | Delgado et al. | |
| 4,355,956 B1 | 10/1982 | Ringrose et al. | |
| 4,360,315 B1 | 11/1982 | Olson | |
| 4,456,429 A * | 6/1984 | Kelland | 416/117 |
| 4,517,467 A * | 5/1985 | Fuhring | 290/44 |
| 4,561,826 B1 | 12/1985 | Taylor | |
| 4,624,624 B1 | 11/1986 | Yum | |
| 5,171,127 B1 | 12/1992 | Feldman et al. | |
| 5,183,386 B1 | 2/1993 | Feldman et al. | |
| 5,531,567 B1 | 7/1996 | Hulls | |
| 6,113,350 B1 | 9/2000 | Liu | |
| 7,040,859 B2 * | 5/2006 | Kane | 415/4.2 |
| 7,126,235 B2 * | 10/2006 | Bernhoff et al. | 290/44 |
| 8,013,569 B2 * | 9/2011 | Hartman | 320/109 |
| 2007/0257494 A1 * | 11/2007 | Vida Marques | 290/55 |
| 2008/0095608 A1 * | 4/2008 | Boatner | 415/4.2 |
| 2008/0267777 A1 | 10/2008 | Lux | |
| 2009/0074581 A1 | 3/2009 | Burlot | |
| 2011/0084495 A1 * | 4/2011 | Wu et al. | 290/55 |
| 2011/0221202 A1 * | 9/2011 | Bernhoff | 290/55 |
| 2012/0061968 A1 * | 3/2012 | Burrell | 290/55 |
| 2012/0133148 A1 * | 5/2012 | Romeo | 290/55 |

FOREIGN PATENT DOCUMENTS

WO    WO 2008153490 A1 * 12/2008

* cited by examiner

*Primary Examiner* — Tulsidas C Patel
*Assistant Examiner* — Viet Nguyen
(74) *Attorney, Agent, or Firm* — Grace J. Fishel

(57) ABSTRACT

A vertical axis wind turbine includes a propeller assembly formed from a hub with downwardly and outwardly depending blades. The propeller assembly has a polygonal base with the blades forming the bases of a triangular surface meeting at a common vertex. The hub is mounted on a spindle which is connected to a shaft which is rotatable. A bendable joint is provided between the spindle and the shaft such that the hub and blades appear to face into the wind and spin. A lower end of the rotatable shaft is connected to a means for utilizing the rotation of the shaft. The angle that the blades make to the hub may be changed such that the blade swept area presented to the wind may be regulated to either speed up or slow down rotation. Struts may be provided between the blades such that longer blades may be used.

14 Claims, 4 Drawing Sheets

SELF ORIENTING VERTICAL AXIS WIND TURBINE

BACKGROUND OF THE INVENTION

1. Field of the Invention

The present invention relates to a vertical axis wind turbine capable of tipping into the wind and spinning. The blade swept area appears like a pyramidal shaped vain pointing into the wind as it spins on a variably oriented spindle. Because the propeller assembly is shaped like a pyramid rather than a flat disk of blades, individual blades may be supported by struts thus allowing for a wind turbine of much larger size.

2. Brief Description of the Prior Art

Recently there has been renewed interest in using wind as a source of energy. The motivating factors are varied but a few key ones include rising oil costs and desiring more energy independence.

Most existing wind turbines are of the horizontal axis design wherein a horizontal rotor shaft and blade assembly is oriented into the wind by a furling tail which may be computer controlled. In high wind, mechanical controls are used to turn the windmill away from the wind to avoid overdriving the alternator or generator. The size of horizontal axis wind turbines is limited by blade strength as the blades must be self supporting. Vertical axis wind turbines are less common wherein the blades are arranged in a squirrel cage configuration. Vertical designs are less efficient because the blades on the backside of the blade swept area must run upwind to come back around, thereby decreasing the efficiency of the wind turbine. The vertical axis design has an advantage over the horizontal axis design in that the means for utilizing the energy, such as an alternator or pump, may be placed at ground or roof level. Thereby allowing for ease of maintenance and less load requirement on the support tower.

What is needed is a wind turbine that combines the benefits of orienting the rotor assembly to face into the wind while at the same time placing the means for utilizing the energy at ground level.

BRIEF SUMMARY OF THE INVENTION

In view of the above, it is an object of the present invention to provide a more efficient vertical axis wind turbine. It is another object to provide a vertical axis wind turbine that points itself into the wind. It is another object to provide a wind turbine with longer blades, capable of generating more power than existing horizontal axis designs. Other objects and features of the invention will be in part apparent and in part pointed out hereinafter.

In accordance with the invention, a self orienting vertical axis wind turbine includes a propeller assembly formed from a hub from which downwardly and outwardly depend a plurality of blades. The propeller assembly has a polygonal base with the blades forming the bases of a triangular surface meeting at a common vertex. The hub is mounted on an upper end of a spindle with a longitudinal axis and the spindle is coupled at a lower end to a joint which is bendable back-and-forth and from side-to-side. The blades extend below the joint such that the center of gravity of the hub and the blades is below the joint.

A rotatable shaft with a longitudinal axis is coupled at its upper end to the joint such that the shaft rotates with the spindle. The longitudinal axis of the spindle and the longitudinal axis of the shaft are nearly vertically aligned when the wind turbine is at rest. When the wind blows the hub and the blades tip into the wind and the propeller assembly begins to spin as the pyramidal swept area of the blades is presented to the wind. As the propeller assembly tilts to face into the wind, the longitudinal axis of the spindle makes a variable angle with respect to the longitudinal axis of the shaft. A means for utilizing the rotation of the shaft is coupled to the shaft.

In an embodiment of the invention, the angle at which the blades join the hub may be varied dynamically such that the blade swept area presented to the wind may be regulated to either speed up or slow down rotation. In an embodiment of the invention there may be struts or guide wires attached to the blades to stabilize or support them in flight. In an embodiment of the invention, a flyweight is attached to the rotatable shaft through a clutch means to selectively store and release energy. The description of other embodiments follow.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
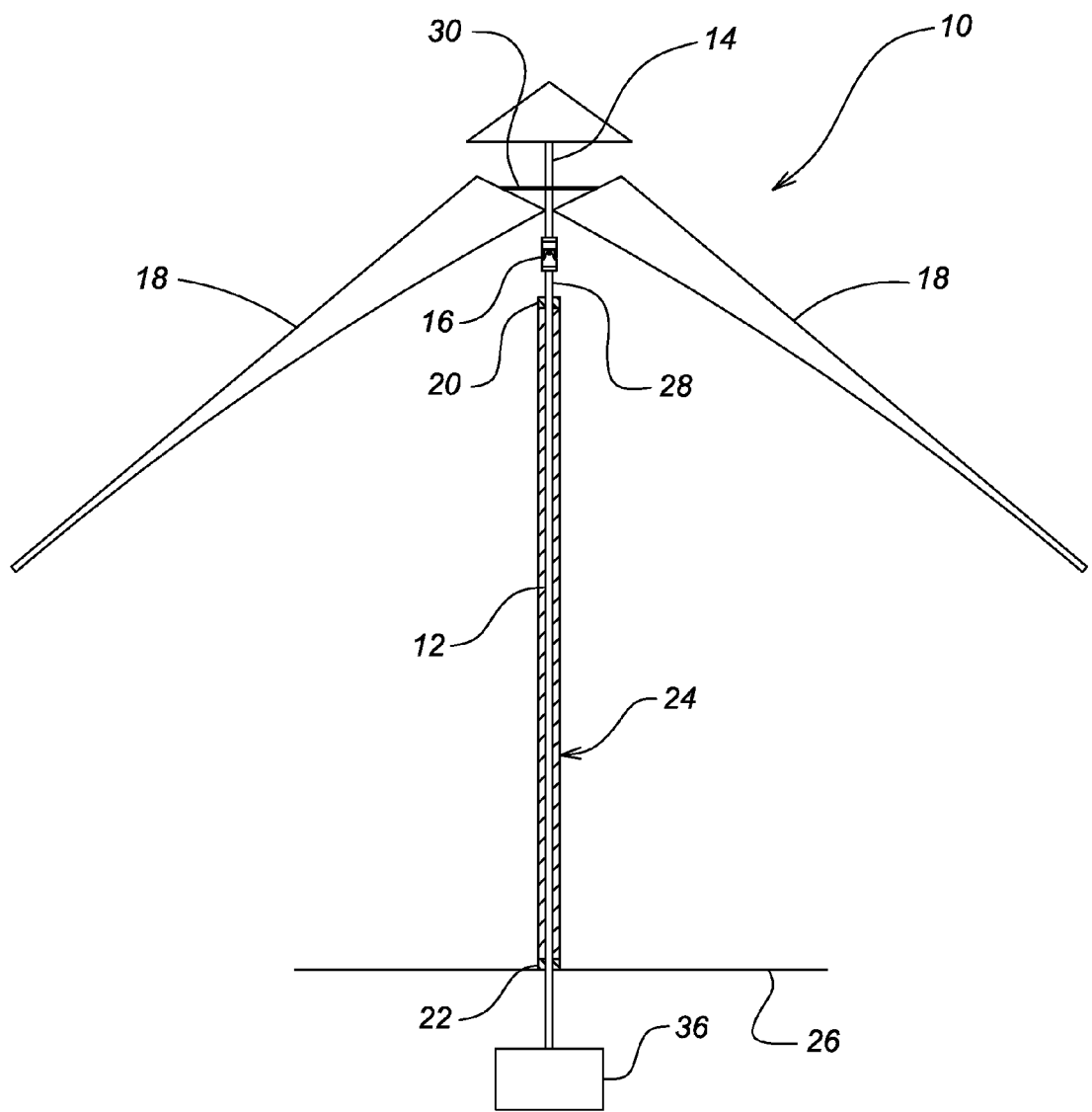
FIG. 1 is a somewhat simplified side elevation of a first wind turbine in accordance with the present invention showing the wind turbine in rest condition.

Referring to the drawings more particularly by reference character, reference numeral 10 refers to a variable axis vertical wind turbine in accordance with the present invention. In major part, wind turbine 10 includes a rotatable shaft 12 and a spindle 14 coupled through a bendable joint 16. Mounted on spindle 14 is a propeller assembly including a plurality of downwardly and outwardly depending blades 18.

Figure 2:
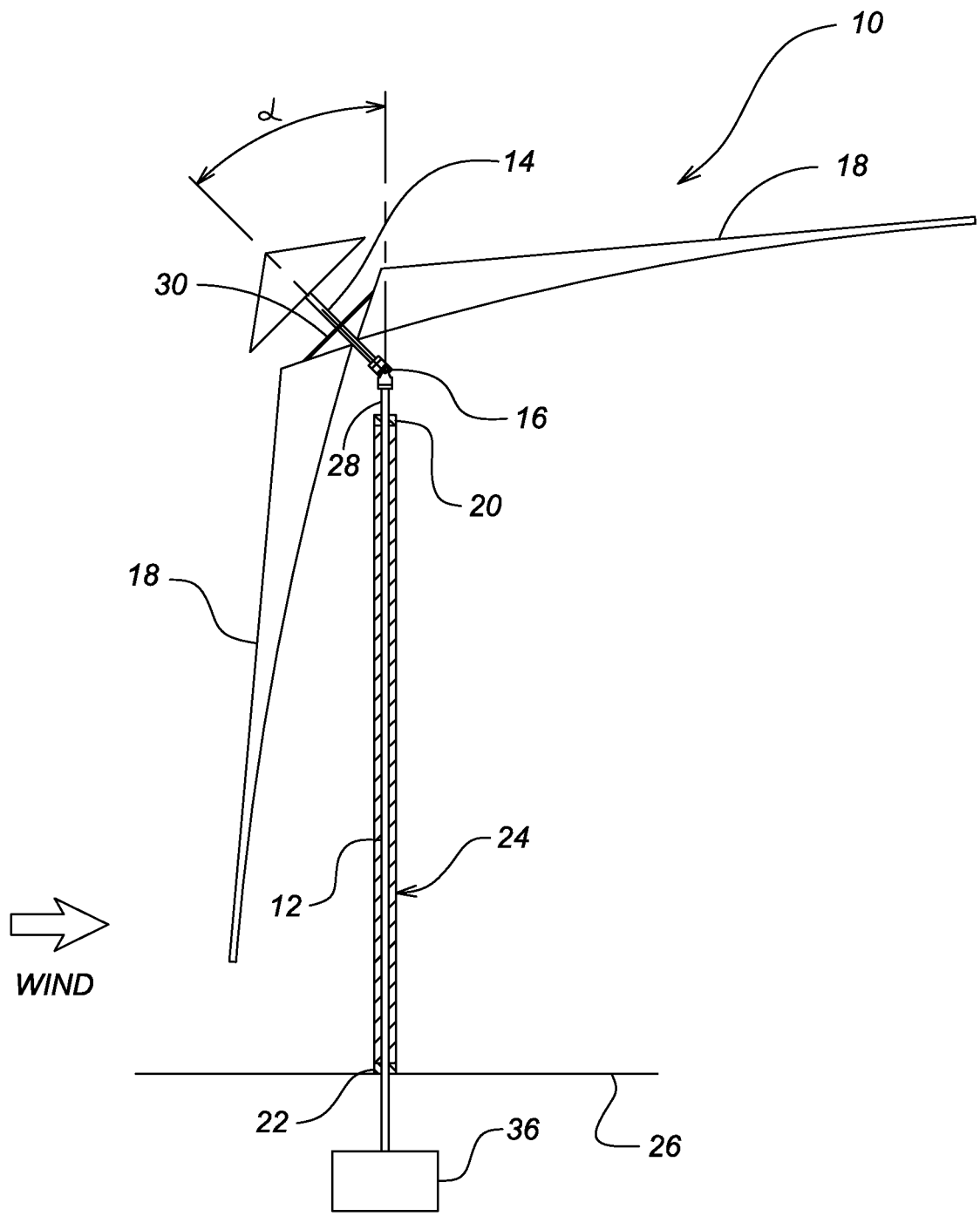
FIG. 2 is a side elevation of the wind turbine while spinning.
Figure 4:
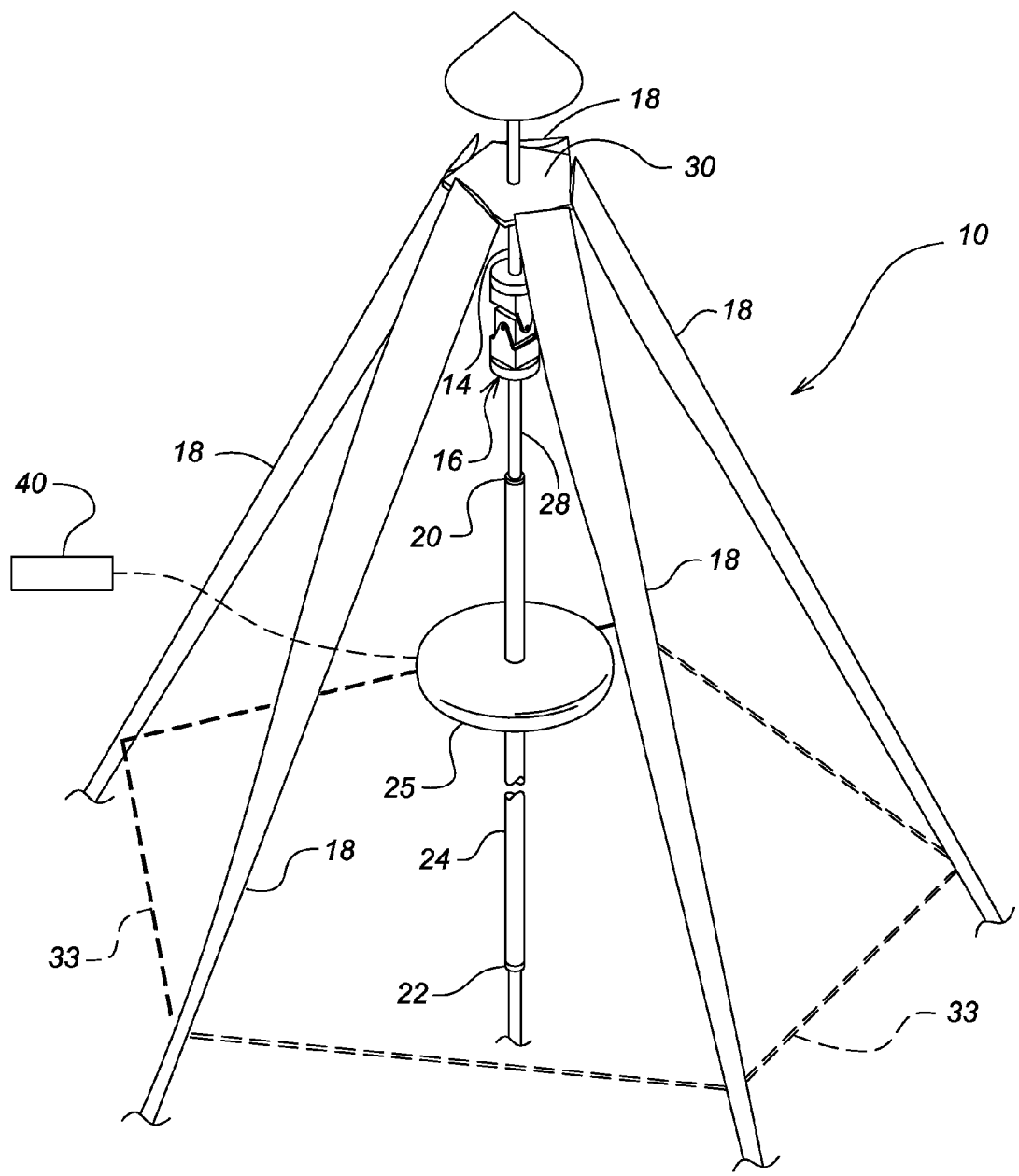
FIG. 4 is a perspective view of a second wind turbine in accordance with the present invention in rest condition; and, FIG. 5 is a vertical cross-section showing a flyweight attached to an end of a rotating shaft which is driven by the wind turbine.

In a first example shown in FIGS. 1 and 2, rotatable shaft 12 is supported for rotation in upper and lower collar bearings 20 and 22, respectively, within a hollow support tower 24. Support tower 24 carries the weight of wind turbine such that rotatable shaft 12 can be dimensioned only for the transmission of torque and thus may be lighter. While less preferred, it will be understood that support tower 24 can be eliminated and rotatable shaft 12 made stronger. In some embodiments (not shown), support tower 24 and/or rotatable shaft 12 may be provided with telescoping sections such that the height of wind turbine 10 may be adjusted to wind conditions. In a second example of wind turbine 10 as shown in FIG. 4, a deflector ring 25 may be mounted on support tower for use as described later.

Support tower 24 may be stabilized by appropriate guys or other supports (not shown), if such are desirable, depending on the size of wind turbine 10 and the wind velocities in which it is to be operated. Preferably wind turbine 10 is supported on a platform 26, which depending on the size of wind turbine 10, may be the roof of a house. It is also preferred that wind turbine 10 be supported with support tower 24 and rotatable shaft 12 in vertical position as shown, so that any wind, regardless of direction, will cause rotation of blades 18 without adjusting the axis of rotatable shaft 12.

An upper end 28 of rotatable shaft 12 extends up through upper collar bearing 20 and is coupled to bendable joint 16 which in turn is coupled to a lower end of spindle 14. Bendable joint 16 allows spindle 14 to "bend" from side-to-side and back-and-forth with respect to rotatable shaft 12. Bendable joint 16 may be formed from a bendable plastic material, springs, cable or a universal or constant velocity joint as best seen in FIG. 4.

Figure 3:
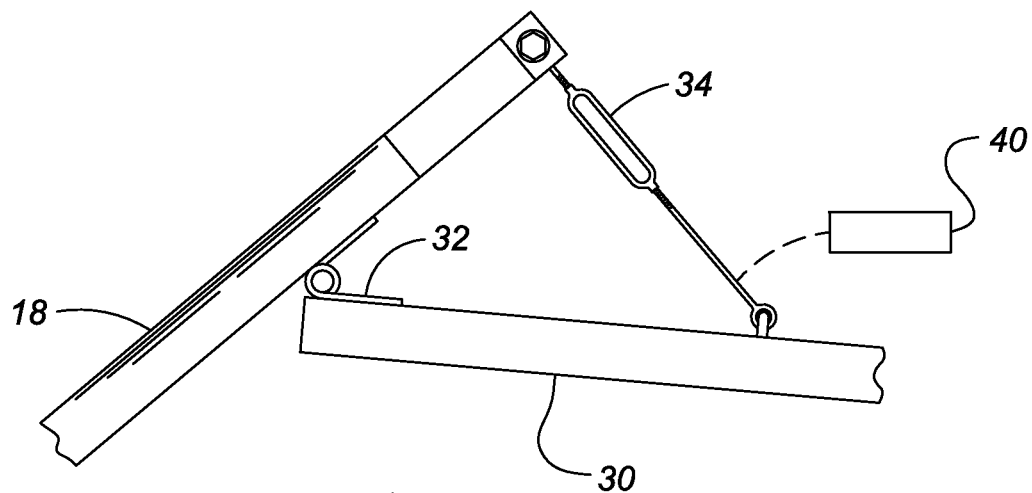
FIG. 3 is a detail of a blade mounted on a hub with means for adjusting the angle of the blade with respect to the hub.

A hub 30 is mounted to an upper end of spindle 14. With reference to FIGS. 1 and 2 and FIG. 4, lower ends of blades 18 extend below bendable joint 16. When the center of gravity of hub 20 and blades 18 is below bendable joint 16, spindle 14 has a tendency to sit upright, axially aligned with rotating shaft 12 in the absence of wind. As shown in FIG. 3, blades may be fastened or coupled to hub 30 through an appropriate collar or hinge 32 such that the angle of the blades may be changed. With continuing reference to FIG. 3, the angle that blades 18 make to hub 30 may be adjusted with a turnbuckle 34 or other appropriate means. Turning to FIG. 4, wires or structural struts 33 may be provided to stabilize blades 18. Blades 18 with struts or wires 33 running between the blades form a more rigid structural assembly that allows for longer blade use. Struts 33 may be of aerodynamic design to impede vibration or enhance wind energy collection efficiency.

As with the blades used for horizontal axis wind turbines, blades 18 may be varied in shape and taper as the radius increases. A large angle of attack at hub 30 increases the startup torque of wind turbine 10, while at the blade tip the airfoil is made thin and oriented nearly perpendicular to the wind since the tips move faster than the ends of blades 18 at hub 30. It is believed that more blades 18 make it easier to start wind turbine 10 in a low wind. While more blades make wind turbine 10 easier to start, it will turn at a lower speed due to increased drag from the added blades. More blades produce a slower speed but may provide a higher operating torque which may be advantageous depending upon the rpm requirements of the means for using energy. With fewer blades, wind turbine 10 spins faster which is advantageous for operating an alternator but may require higher wind speed to start. As mentioned above, the inclination of blades 18 with respect to hub 30 may be changed so long as the combined center of gravity of hub 30 and blades 18 is below joint 16 such that spindle 14 tends to sit upright. Within that limitation, the wider the blades are spread, the larger the cross sectional area of the wind intercepted and hence the more power generated.

A lower end of rotatable shaft 12 is coupled to a means for utilizing the rotation of the shaft. Utilization means 36 may be an appropriate apparatus or mechanism which may convert the rotary motion of rotatable shaft 12 into electricity, for example and alternator or generator, or which may provide some other operation or function, for example pumping a fluid, pressurizing a gas, or operating another apparatus or mechanism. An advantage of wind turbine 10, relative to horizontal-axis wind turbines, is that maintenance of utilization means 36 is easy, since it is at ground level.

In use, the axis of spindle 14 is variable as hub 30 and blades 18 tend to tip into the wind as shown in FIG. 2 such that the longitudinal axis of spindle 14 makes a variable angle alpha with respect to the longitudinal axis of rotatable shaft 12. The wind causes wind blades 18 on hub 30 to appear to tilt into the wind as the pyramidal shaped blade swept area is pushed by the wind. This causes the turbine to start turning. The angle at which blades 18 hang may be dynamically managed by a computer 40 such that the cross sectional area changes thus controlling the amount of energy collected. Thus the velocity of rotation may be throttled by changing the angle at which the blades hang. Another means of control is provided by deflector ring 25 as shown in FIG. 4 which may be moved up and down. Deflector ring 25 may serve as an emergency stop and also limited the angle at which the axis of spindle 14 may tip with respect to the longitudinal axis of rotatable shaft 12 to prevent the blades from striking the tower. Movement of deflector ring 25 may also be under control of a computer 40.

Figure 5:
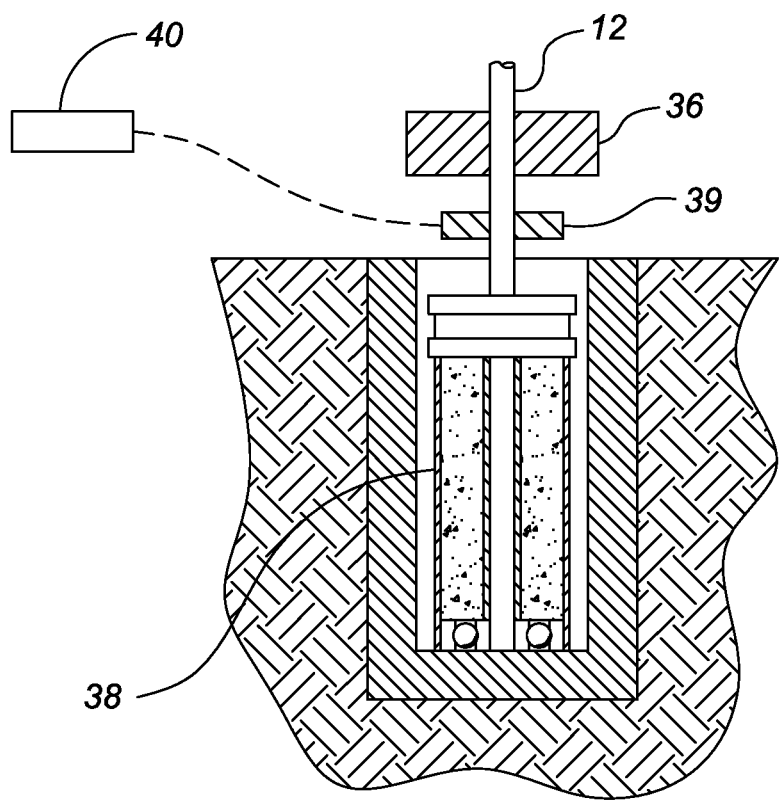

A shortcoming of conventional vertical shaft wind turbines is that output cannot be controlled by simply turning the blades such that they do not catch the wind. Hence conventional vertical shaft wind turbines require the generator or alternator to be provided with braking or over load control or for it to be dimensioned large enough to receive the high output. In the present instance, in addition to being able to change the angle of blades 18 with respect to hub 30, as shown in FIG. 5, a flyweight 38 may be selectively coupled to and decoupled from rotating shaft 12 with a clutch means 39. This allows a user to store energy during high winds and to extract energy to start rotation of wind turbine 10 when wind velocity is sufficient to sustain blade movement but insufficient to initiate blade movement. Clutch means 39 may also be under control of a computer 40.

Existing wind turbine designs are limited by the length of the blades that can be self supporting. An embodiment of the present invention utilizes structural supports (i.e., struts 33) between blades to form a propeller assembly that resembles more closely a pyramid than a flat disk of blades. The strength of the pyramid structure may allow for longer blade length, which in turn allows for more power to be collected from the wind.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A self orienting vertical axis wind turbine comprising
a hub from which downwardly and outwardly depend a plurality of blades, said blades balanced about a center of rotation of the hub,
said hub mounted to an upper end of a spindle with a longitudinal axis,
said spindle having an axis and coupled at a lower end to a joint which is bendable back-and-forth and from side-to-side,
said blades extending below the joint such that the center of gravity of the hub and the blades is below the joint in both a vertical rest position and a tipped position with respect to vertical,
a rotatable shaft with a longitudinal axis and an upper end coupled to the joint such that the shaft rotates with the spindle, said longitudinal axis of the spindle and said longitudinal axis of the shaft being vertically aligned when the wind turbine is in the rest position and said longitudinal axis of the spindle making a variable angle with respect to the longitudinal axis of the shaft limited to an angle that the center of gravity of the hub and the blades is below the joint when the wind turbine is in the tipped position,
said rotatable shaft coupled at a lower end to a means for utilizing the rotation of the shaft.

2. The wind turbine of claim 1 wherein the bendable joint is a universal joint.

3. The wind turbine of claim 2 wherein the blades are fastened to the hub such that the angle that the blades make to the hub is under the control of an operator.

4. The wind turbine of claim 3 wherein the operator is a computer.

5. The wind turbine of claim 2 wherein the rotatable shaft is supported for rotation in upper and lower bearings within a hollow support tower.

6. The wind turbine of claim 1 wherein the number of blades is odd.

7. The wind turbine of claim 6 where the blades are cambered.

8. A self orienting vertical axis wind turbine comprising
a hub from which downwardly and outwardly depend a plurality of blades, said blades balanced about a center of rotation of the hub,
said hub mounted to an upper end of a spindle with a longitudinal axis,
said spindle having an axis and coupled at a lower end to a universal joint which is bendable back-and-forth and from side-to-side,
said blades extending below the joint such that the center of gravity of the hub and the blades is below the joint in both a vertical rest position and a tipped position with respect to vertical,
a rotatable shaft with a longitudinal axis and an upper end coupled to the joint such that the shaft rotates with the spindle, said longitudinal axis of the spindle and said longitudinal axis of the shaft being vertically aligned when the wind turbine is in the rest position and said longitudinal axis of the spindle making a variable angle with respect to the longitudinal axis of the shaft limited to an angle that the center of gravity of the hub and the blades is below the joint when the wind turbine is in the tipped position,
said rotatable shaft coupled at a lower end to a means for utilizing the rotation of the shaft including a clutch for engaging and disengaging a flyweight.

9. The wind turbine of claim 8 wherein the blades are fastened to the hub such that the angle that the blades make to the hub is under the control of an operator.

10. The wind turbine of claim 9 wherein the operator is a computer.

11. The wind turbine of claim 8 wherein the rotatable shaft is supported for rotation in upper and lower bearings within a hollow support tower.

12. The wind turbine of claim 8 wherein the number of blades is odd.

13. The wind turbine of claim 12 wherein the blades are cambered.

14. The wind turbine of claim 8 wherein the means for utilizing the rotation of the shaft generates electricity.

* * * * *